April 23, 1929.   V. BENDIX   1,710,338
SERVO BRAKE
Filed July 16, 1925   3 Sheets-Sheet 1

INVENTOR
VINCENT BENDIX
BY
ATTORNEY

April 23, 1929.  V. BENDIX  1,710,338

SERVO BRAKE

Filed July 16, 1925  3 Sheets-Sheet 3

INVENTOR
VINCENT BENDIX
BY
ATTORNEY

Patented Apr. 23, 1929.

1,710,338

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

SERVO BRAKE.

Application filed July 16, 1925. Serial No. 43,951.

This invention relates to brakes, and is illustrated as embodied in a brake for a swivelled automobile wheel. An object of the invention is to secure a maximum use of the momentum of the car as a source of power in applying the brake, by arranging a servo device, preferably one which is effective in either direction of drum rotation, to operate a brake of the "self-energizing" type which aids in applying itself by wrapping against the drum. I prefer to use what is known as a "three-shoe" brake, having a single shoe effective in reverse and connected shoes retarding forward movement.

Other features of the invention relate to applying a brake of the servo type by connections including a joint movable in applying the servo generally at right angles to the swivelling axis, preferably so arranged that swivelling the wheel relieves or otherwise varies the pressure on the servo, and to various other novel combinations of parts and desirable particular constructions which will be apparent from the following description of one illustrative embodiment shown in the accompanying drawings, in which.

Figure 1:
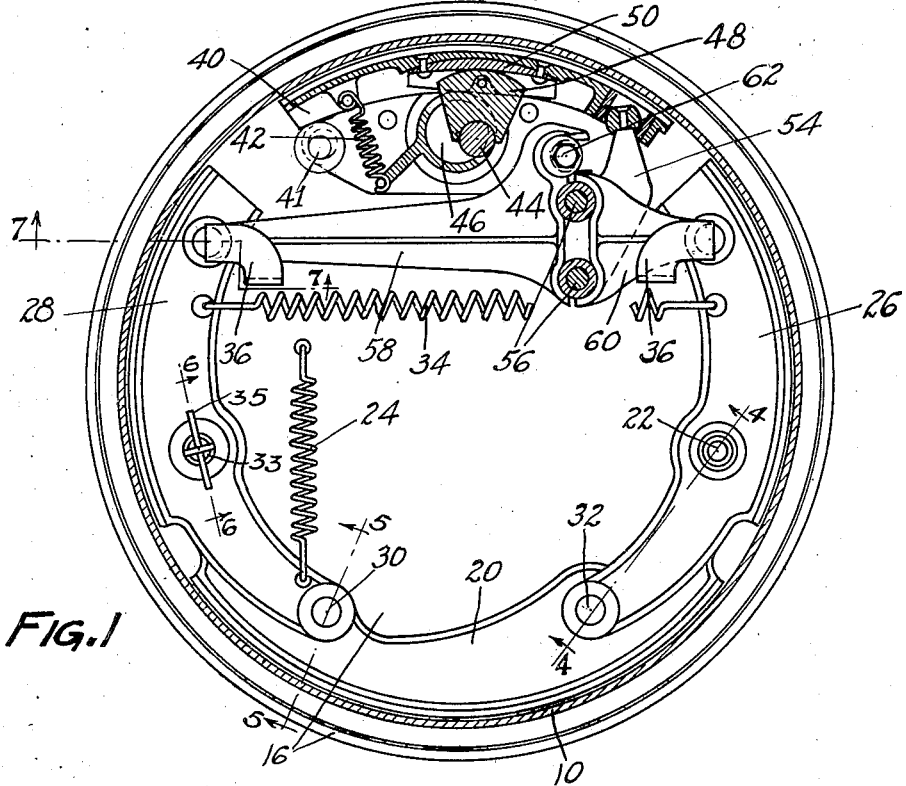
Figure 1 is a vertical section through the brake, just inside the wheel, showing the shoes in side elevation, and partly broken away in central section to show the servo-operating means.

The illustrated brake includes a drum 10 turning with a wheel, the hub of which is shown at 12, the wheel being rotatably mounted on a knuckle 14 carrying the backing plate or other stationary support 16 and swivelled by the usual kingpin at one end of the axle 18.

Within the drum is a central shoe 20 anchored at 22, and urged away from the drum by a spring 24. At opposite ends of shoe 20 are a reverse shoe 26 and a floating shoe 28, shown forked at their ends to straddle the web of shoe 20, and pivotally connected thereto at 30 and 32, pivot 32 serving as the anchor for shoe 26. Spring 24 is shown connected to shoe 28 near pivot 30, and acting through the pivot on shoe 20. Shoe 26 has comparatively large openings in the arms of its forked end for anchor 22. It will be seen that shoes 20, 26, and 28 form a convenient sub-assembly unit. Shoes 26 and 28 are urged away from the drum by a spring 34 to their idle positions. U-shaped sheet-metal steady-rests 36 secured to the backing plate hold the shoes laterally. Shoe 28 may be urged toward the backing plate by an anti-rattle spring 33 connected to the backing plate at one end and at its other end to a pin 35 bridging an opening in the shoe. Spring 34 holds member 58 against the stop 62, as any movement away from the stop tensions the spring.

Shoes 26 and 28 are spread against the drum by a servo shoe 40 arranged between their free ends, and forced against the drum against the resistance of a spring 42 by an eccentric pin 44 on a shaft 46 operating a segmental roller-link 48 engaging a hardened plate 50 on the servo shoe. Link 48 is shown with a pin 52 engaging notches in servo shoe 40, to insure a rolling contact between the link and plate 50 as the shoe is moved in one direction or the other by the friction of the drum.

Movement of the servo shoe in either direction rocks a floating lever 54 having a pair of vertically-spaced pins 56 seated in notches in the ends of two push links 58 and 60 engaging the ends of shoes 26 and 28 and guided by the U-shaped stops 36. The idle positions of the links are determined by a stop 62 having an adjustable eccentric portion engaging a notch in link 58, and the idle position of shoe 40 is determined by a roller stop 41, against which it is urged by spring 42.

Figure 2:
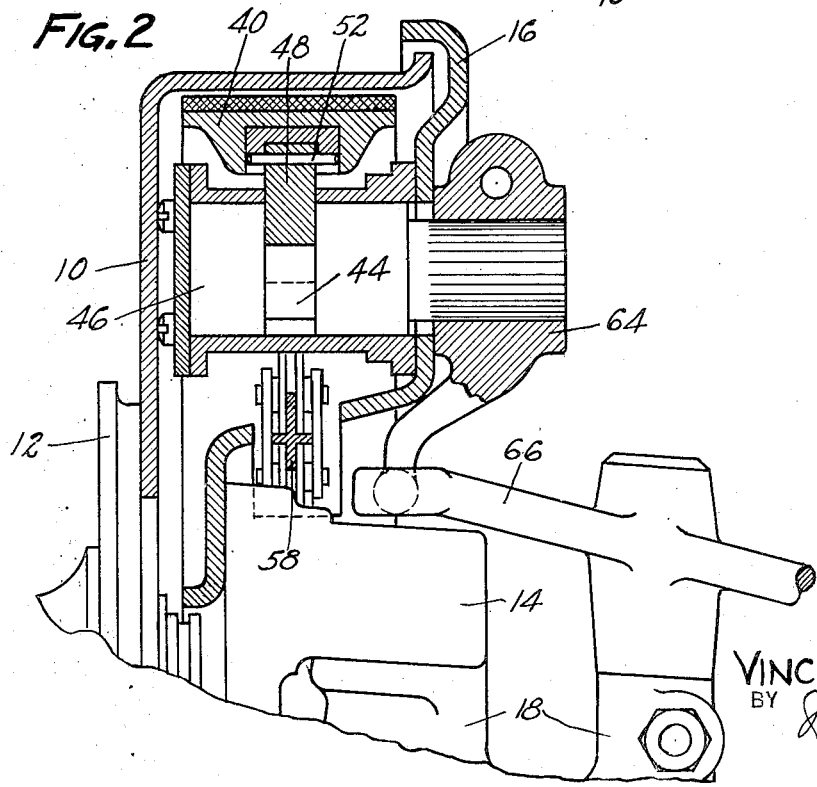
Figure 2 is a vertical section at right angles to Figure 1, centrally through the upper part of Figure 1.

Shaft 46 has a serrated end extending outside plate 16, and adjustably clamped thereon is an operating arm 64 having a ball end engaged by a generally horizontal lever 66 fulcrumed on axle 18 and operated by the usual connections from the service pedal. It will be seen that arm 64 and lever 66 constitute respectively swivelling and non-swivelling parts having a joint movable in applying the servo device from an idle position spaced rearwardly of the swivelling axis to an active position substantially in that axis. In Figure 2 we are looking forwardly of the car toward the left front wheel. Tension on the right end of lever 66 in this figure moves the left end forwardly toward the swivelling axis of the wheel.

I prefer, however, to arrange the parts so that swivelling the front wheels to round a corner will automatically relieve the pressure on the outer brake. In the arrangement shown, this is accomplished by arranging the active position of the point between parts 64 and 66 not exactly in the swivelling axis, but slightly outside that axis,—that is, on the side toward the wheel.

Figure 3:
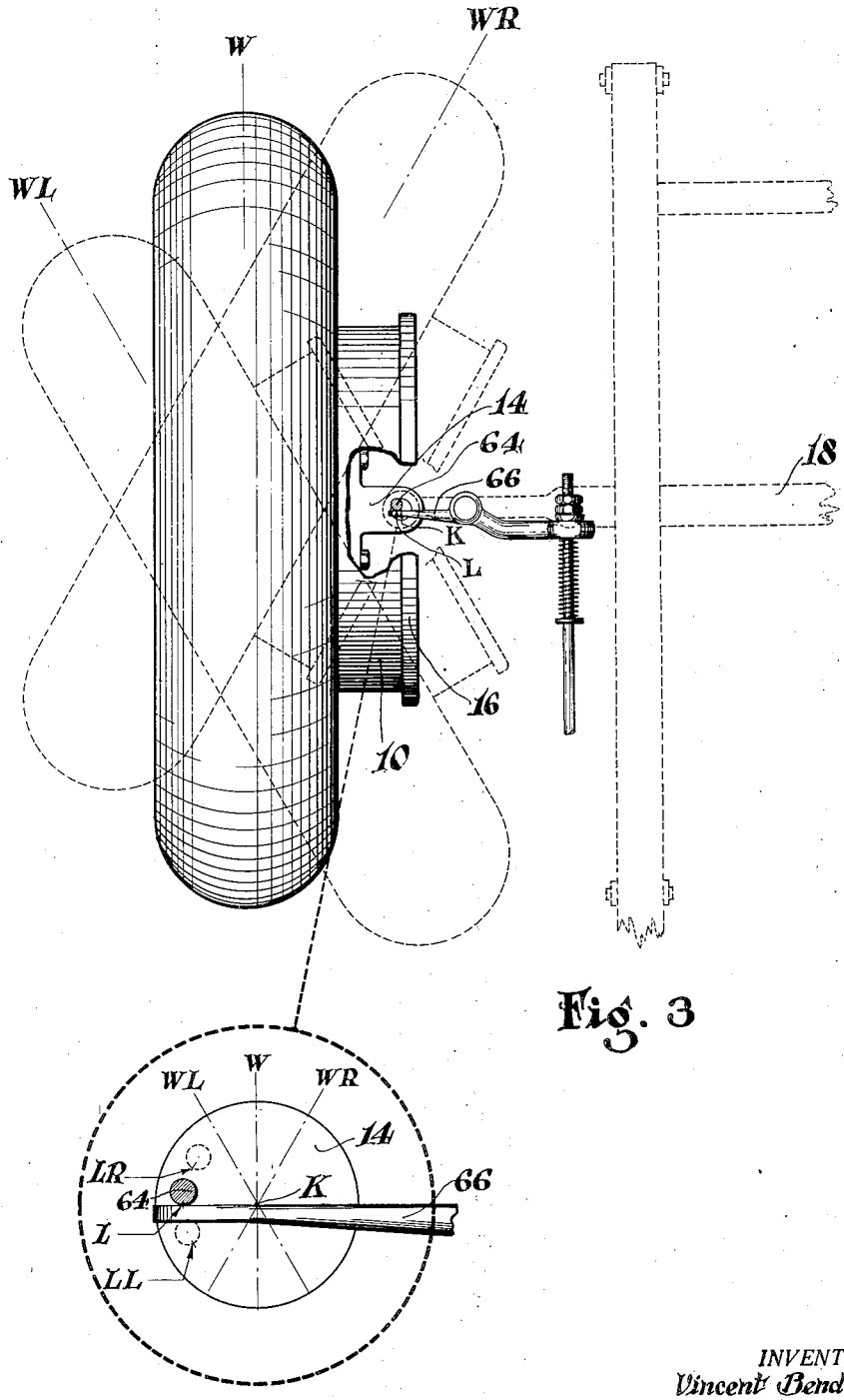
Figure 3 is a diagram showing how swivelling the wheel relieves the pressure on the servo device of the outer brake.
Figure 4:
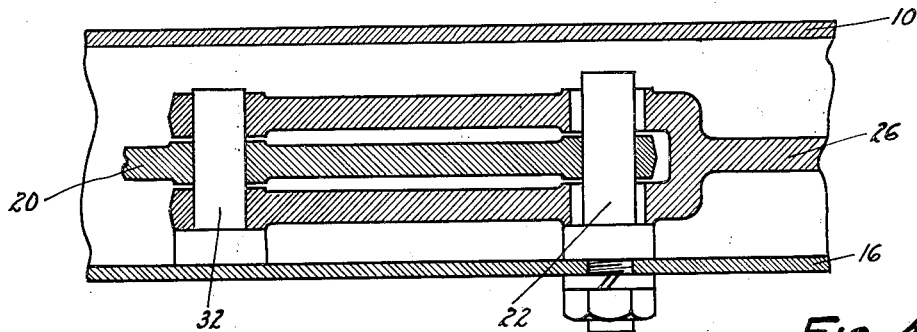
Figure 4 is a partial section on the line 4—4 of Figure 1, showing the brake anchorage.
Figure 5:
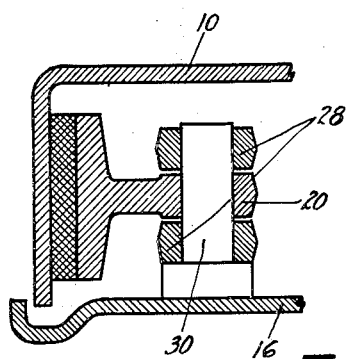
Figure 5 is a partial section on the line 5—5 of Figure 1, showing the pivotal connection between two of the shoes.
Figure 7:
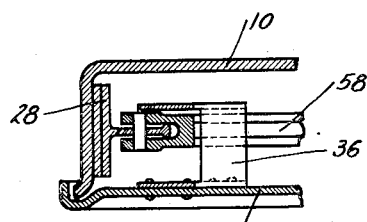
Figure 7 is a partial section on the line 7—7 of Figure 1, showing part of the operating means.
Figure 6:
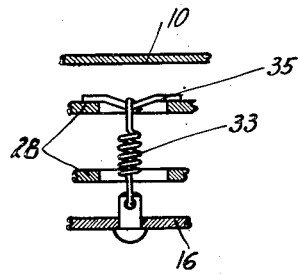
Figure 6 is a partial section on the line 6—6 of Figure 1, showing an anti-rattle spring.

Figure 3 shows this on an enlarged scale, this figure being a diagram of the parts in top plan, with the front of the car at the top of the figure. W is a line through the swivelling axis represented at K, parallel to the wheel when straight ahead, and L is the position of the joint between the end of levers 64 and 66 at that time if the brake is applied. The plane of the wheel is outside the figure at the left, and the chassis frame is outside the figure at the right. If now the wheel is swivelled to the right, to a position parallel to the line WR, at which time it is on the outer side of the turn, the joint tends to move to LR,—i. e., arm 64 swings away from lever 66 and thereby relieves the pressure on the brake. On the other hand, if the wheel is swivelled to a position parallel to WL, on the inside of the turn, the joint tens to move to LL,—i. e., arm 64 crowds against lever 66 and slightly tightens the brake. Of course, when this differential action is desired, the two front brakes are not equalized. The above described differential action, in combination with my novel servo brake, is not claimed in the present application, as it forms the subject-matter of my divisional application No. 343,316, filed February 28, 1929.

While one illustrative embodiment of the invention has been described in detail, it is not my intention to limit its scope to that particular embodiment, or otherwise than by the terms of the appended claims.

I claim:

1. A brake comprising, in combination, a drum, a single shoe and a pair of connected shoes within the drum, connections for spreading the shoes against the drum, and a servo shoe engageable with the drum and arranged to operate said connections.

2. A brake comprising, in combination, a drum, a single shoe and a pair of connected shoes anchored at adjacent ends within the drum, connections for spreading the shoes against the drum and a servo shoe engageable with the drum between the unanchored ends of the shoes and arranged to operate said connections.

3. A brake comprising, in combination, a drum, a central shoe within the drum, a pair of end shoes at opposite ends of the central shoe, a servo shoe between the end shoes, and connections operated by the servo shoe to force the end shoes against the drum, one of the end shoes forcing the central shoe against the drum.

4. A brake comprising, in combination, a drum, a central shoe within the drum, a pair of end shoes pivotally connected to the central shoe, a servo shoe between the unpivoted ends of the end shoes, and connections operated by the servo shoe to force the end shoes against the drum, one of the end shoes forcing the central shoe against the drum, the central shoe and two end shoes forming a sub-assembly unit.

5. A brake comprising, in combination, a drum, a pair of shoes extending in opposite directions adjacent the drum, an anchor pivot for each shoe between the ends of the other shoe, a servo shoe engageable with the drum and moved circumferentially of the drum by the drum friction, and means operated by movement of the servo shoe in either direction to force the pair of shoes against the drum.

6. A brake comprising, in combination, a drum, a pair of shoes extending in opposite directions adjacent the drum, an anchor pivot for one shoe between the ends of the other shoe, said other shoe being pivotally anchored on the anchored shoe, a servo shoe engageable with the drum and moved circumferentially of the drum by the drum friction, and means operated by movement of the servo shoe in either direction to force the pair of shoes against the drum.

7. A brake comprising, in combination, a drum, a shoe anchored within the drum, a floating shoe connected to the unanchored end of the anchored shoe, and a servo device arranged to utilize the drum friction to force the unconnected end of the floating shoe against the drum.

In testimony where of I have hereunto signed my name.

VINCENT BENDIX.